United States Patent
Fukushima

(10) Patent No.: US 12,492,089 B2
(45) Date of Patent: Dec. 9, 2025

(54) SHEET CONVEYANCE APPARATUS, IMAGE READING APPARATUS INCLUDING SHEET CONVEYANCE APPARATUS, AND IMAGE FORMING APPARATUS

(71) Applicant: CANON KABUSHIKI KAISHA, Tokyo (JP)

(72) Inventor: Takayuki Fukushima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 18/349,813

(22) Filed: Jul. 10, 2023

(65) Prior Publication Data
US 2024/0017944 A1 Jan. 18, 2024

(30) Foreign Application Priority Data
Jul. 13, 2022 (JP) ................................. 2022-112265

(51) Int. Cl.
*B65H 5/36* (2006.01)
*B65H 1/04* (2006.01)
(Continued)

(52) U.S. Cl.
CPC ................. *B65H 5/36* (2013.01); *B65H 1/04* (2013.01); *B65H 3/0684* (2013.01); *B65H 3/66* (2013.01); *B65H 7/04* (2013.01); *H04N 1/00602* (2013.01); *H04N 1/00615* (2013.01); *H04N 1/00689* (2013.01); *B65H 2402/441* (2013.01); *B65H 2402/60* (2013.01); *B65H 2404/6111* (2013.01);
(Continued)

(58) Field of Classification Search
CPC .......... B65H 1/04; B65H 3/0684; B65H 3/66; B65H 5/36; B65H 7/02; B65H 7/04; B65H 7/14
See application file for complete search history.

(56) References Cited

U.S. PATENT DOCUMENTS

| | | | |
|---|---|---|---|
| 2002/0030321 A1* | 3/2002 | Sugiyama | H04N 1/00602 271/226 |
| 2012/0074643 A1* | 3/2012 | Imura | G03G 15/6511 271/225 |

(Continued)

FOREIGN PATENT DOCUMENTS

| | | |
|---|---|---|
| JP | 2005194011 A | 7/2005 |
| JP | 2010018412 A | 1/2010 |

*Primary Examiner* — Prasad V Gokhale
(74) *Attorney, Agent, or Firm* — Canon U.S.A., Inc. IP Division

(57) ABSTRACT

A sheet conveyance apparatus includes a base unit, a sheet stacking portion, a feeding portion, an open/close member, a conveyance guide member, a protruding portion, and a fitted portion. The feeding portion feeds a sheet stacking portion stacked sheet. The open/close member includes an upper guide facing an upper surface of the fed sheet. The conveyance guide member includes a lower guide facing a lower surface of the fed sheet and forms a sheet conveyance path with the upper guide. The protruding portion is provided on one of the open/close member and the conveyance guide member. The fitted portion is on the other of the open/close member and the conveyance guide member and is fitted with the protruding portion. In a state where the open/close member is closed, a position of the conveyance guide member in a width direction is determined by the protruding portion fitting into the fitted portion.

8 Claims, 14 Drawing Sheets

(51) Int. Cl.
*B65H 3/06* (2006.01)
*B65H 3/66* (2006.01)
*B65H 7/04* (2006.01)
*H04N 1/00* (2006.01)

(52) U.S. Cl.
CPC ...... *B65H 2511/12* (2013.01); *B65H 2553/61* (2013.01); *B65H 2601/11* (2013.01); *B65H 2801/06* (2013.01)

(56) References Cited

U.S. PATENT DOCUMENTS

2013/0249161 A1* 9/2013 Uchino .................. B65H 5/36
 271/9.01
2016/0306314 A1* 10/2016 Suto ..................... H04N 1/00
2023/0391570 A1* 12/2023 Yamada ................ B65H 1/04

\* cited by examiner

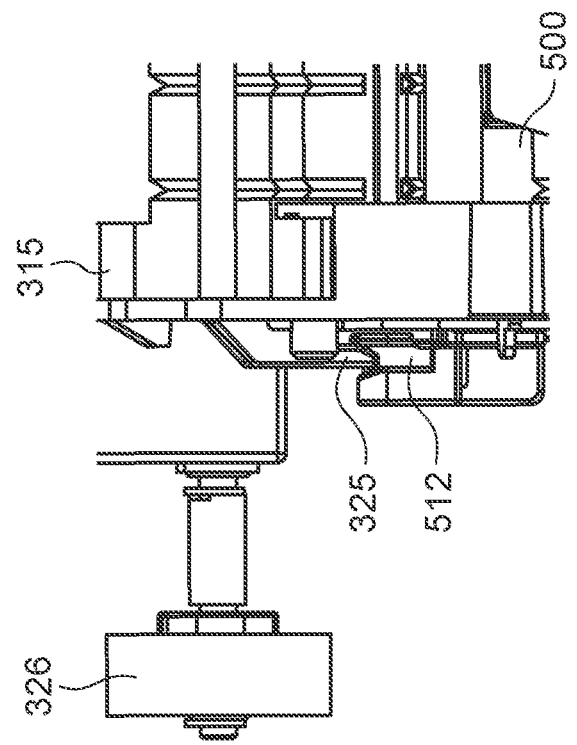
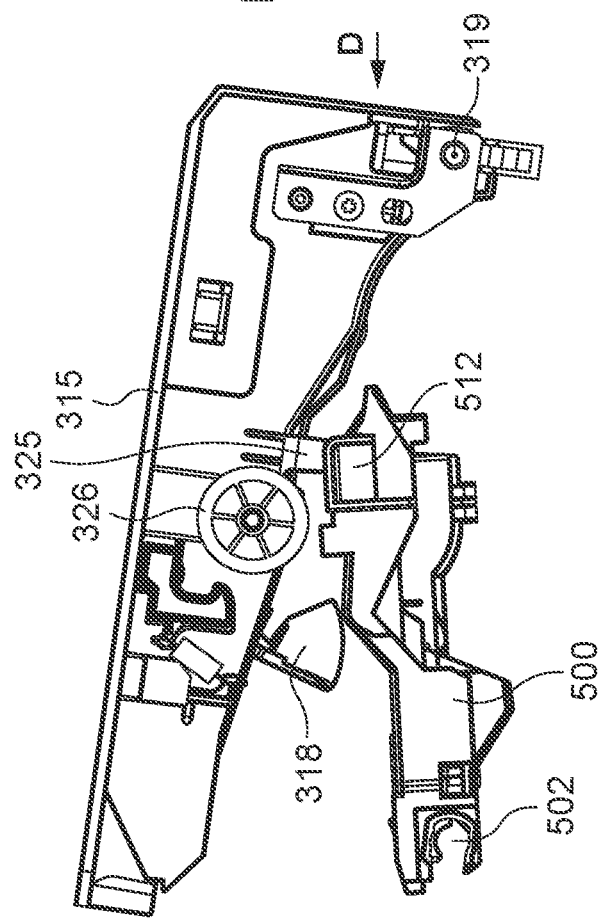
FIG. 13A
FIG. 13B

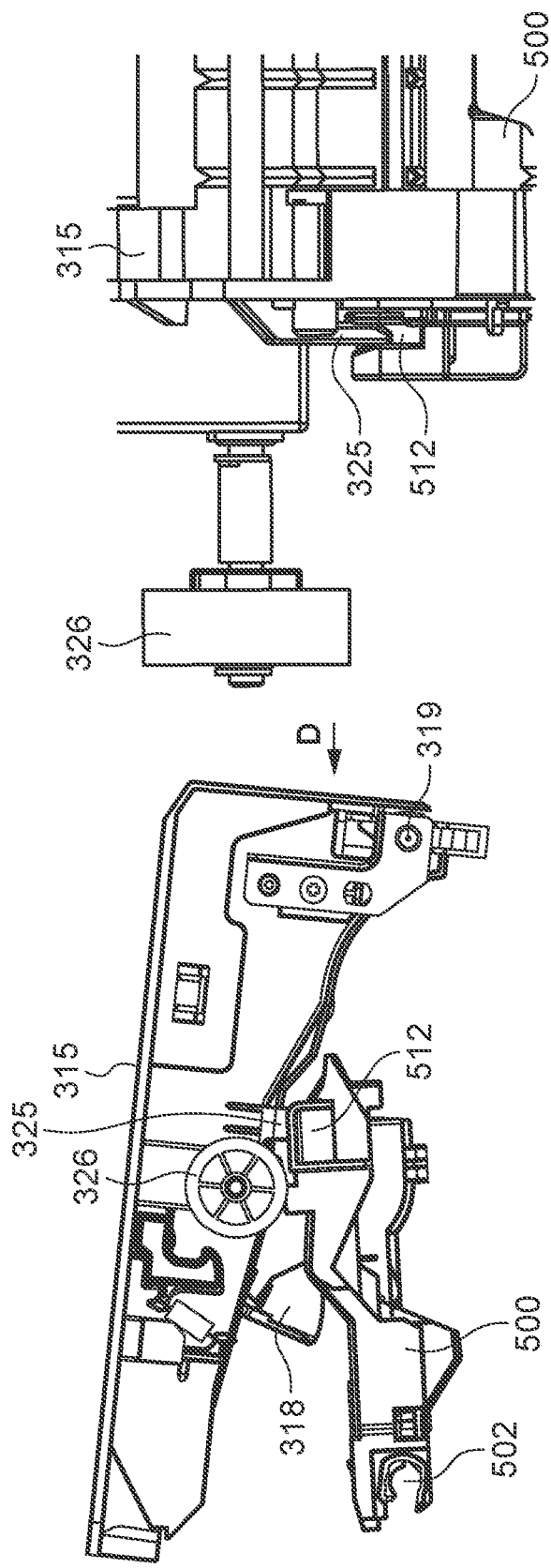

SHEET CONVEYANCE APPARATUS, IMAGE READING APPARATUS INCLUDING SHEET CONVEYANCE APPARATUS, AND IMAGE FORMING APPARATUS

BACKGROUND

Field

The present disclosure relates to a sheet conveyance apparatus for conveying a sheet, and an image reading apparatus including the sheet conveyance apparatus, and an image forming apparatus.

Description of the Related Art

There has been known an image reading apparatus, which is mounted on an image forming apparatus such as a copying machine, including an automatic document feeder (hereinbelow, referred to as an ADF) for conveying documents stacked on a document tray sheet by sheet. In a case where a reading unit for reading an image on a document is disposed in such an ADF, a conveyance path may be configured to be openable so that a glass surface facing a document is to be cleaned or a jam clearance operation is to be performed. Japanese Patent Application Laid-open No. 2005-194011 discusses a configuration including an open/close member forming an upper surface of an ADF, and a conveyance guide member forming a conveyance path of the ADF that are rotatable so that a glass surface of a reading unit is exposed to the outside of the image reading apparatus.

There is known an ADF provided with a regulation member for regulating a leading edge of a sheet stacked on a document tray, and a sensor for detecting the presence/absence of a sheet stacked on the document tray. Examples of the sensor for detecting the presence/absence of a sheet includes a type of sensor, an output signal of which is switched by a flag member that rotates by being pushed by a sheet to enter between a light emitting unit and a light receiving unit. Japanese Patent Application Laid-open No. 2010-18412 discusses a document conveyance apparatus in which the number of components is reduced by using a regulation member for regulating a leading edge position of a sheet as a flag member for detecting the sheet. In the configuration discussed in Japanese Patent Application Laid-open No. 2010-18412, the regulation member with a function of the flag member is arranged to hang down from an open/close member, and a sensor for detecting the presence/absence of a sheet is provided on a conveyance guide member facing the open/close member.

In the configuration including the rotatable open/close member and the rotatable conveyance guide member, because each of the open/close member and the conveyance guide member is supported by a base unit of the ADF via a rotation shaft, the relative position between the open/close member and the conveyance guide member may not be stable. In such a configuration, in a case where a regulation member is used as a flag member, the regulation member and the conveyance guide member may interfere with each other to lead to a breakage of the regulation member or the sensor, in a process of the regulation member entering the sensor located in the conveyance guide member by closing the open/close member.

SUMMARY

The present disclosure is directed to a sheet conveyance apparatus, an image reading apparatus, and an image forming apparatus capable of, in a configuration including a rotatable open/close member and a rotatable conveyance guide member, improving the stability of a relative position between the open/close member and the conveyance guide member.

According to an aspect of the present disclosure, a sheet conveyance apparatus includes a base unit, a sheet stacking portion on which a sheet is to be stacked, a feeding portion configured to feed the sheet stacked on the sheet stacking portion, an open/close member including an upper guide that faces in a direction of an upper surface of the sheet fed by the feeding portion and that is configured to guide the sheet, and rotatably supported on the base unit, a conveyance guide member including a lower guide facing in a direction of a lower surface of the sheet fed by the feeding portion and, in combination with the upper guide, forming a sheet conveyance path through which the sheet is to be conveyed, and rotatably supported on the base unit, a protruding portion provided on one of the open/close member and the conveyance guide member, and a fitted portion provided on the other one of the open/close member and the conveyance guide member, and configured to be fitted with the protruding portion, wherein, in a state where the open/close member is closed, a position of the conveyance guide member in a width direction is determined by the protruding portion fitting into the fitted portion.

Further features of the present disclosure will become apparent from the following description of exemplary embodiments with reference to the attached drawings.

BRIEF DESCRIPTION OF THE DRAWINGS

FIGS. 13A and 13B are diagrams each illustrating the open/close cover and the rotational guide member when a rotational angle of the open/close cover is 8 degrees.

FIGS. 14A and 14B are diagrams each illustrating the open/close cover and the rotational guide member when the rotational angle of the open/close cover is 6 degrees.

DESCRIPTION OF THE EMBODIMENTS

With reference to the attached drawings, exemplary embodiments of the present disclosure will be described. Note that the following exemplary embodiments are just examples embodying the present disclosure, and not intended to limit the technical scope of the present disclosure.

<Image Forming Apparatus>

Figure 1:
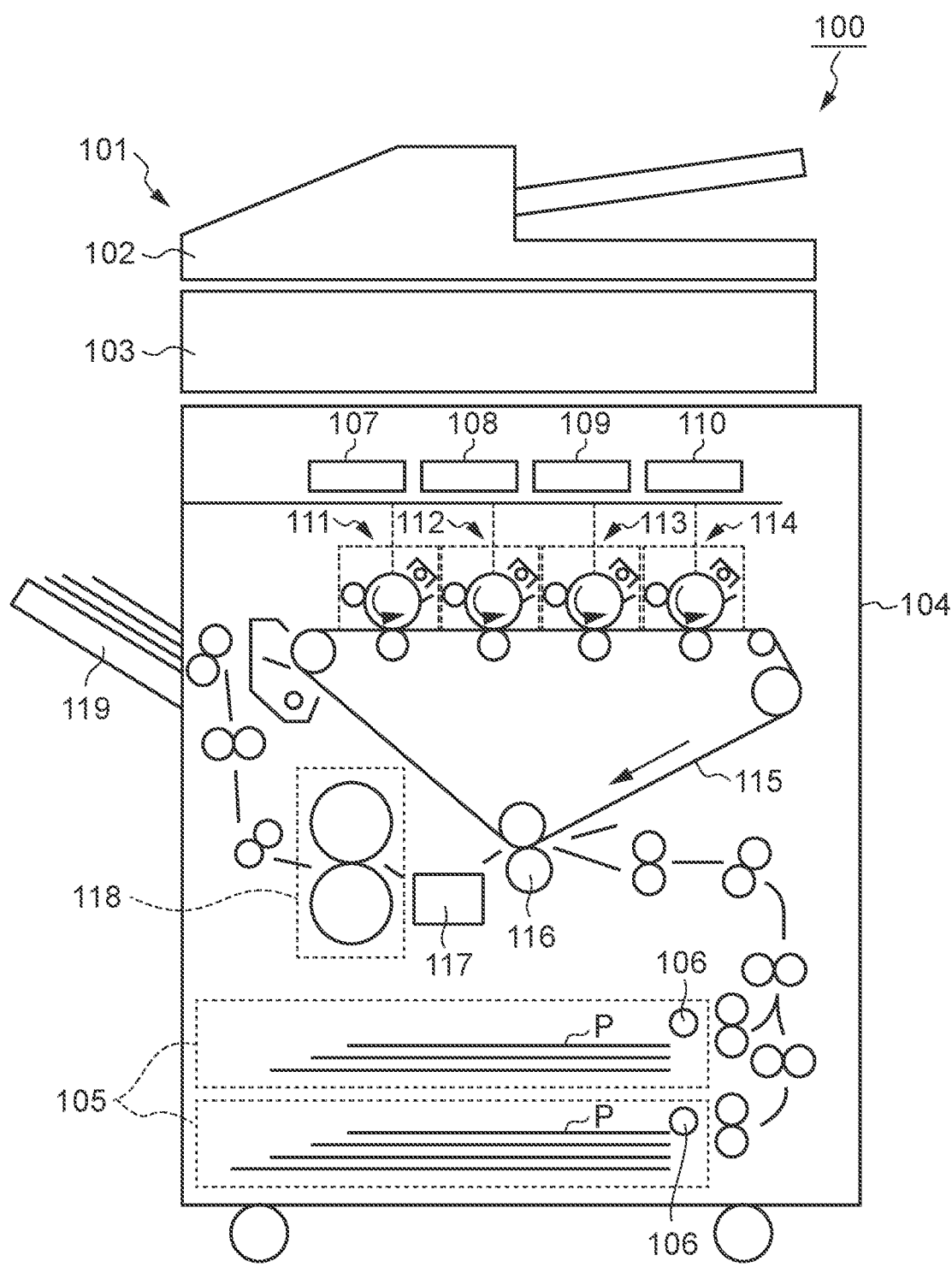
FIG. 1 is a schematic cross-section diagram of an image forming apparatus.

With reference to FIG. 1, an image forming apparatus 100 according to an exemplary embodiment will be described. FIG. 1 is a schematic cross-section diagram of the image forming apparatus 100 viewed from the front side. As illustrated in FIG. 1, the image forming apparatus 100 includes an image forming apparatus main body 104, and an image reading apparatus 101 disposed above the image forming apparatus main body 104. The image forming apparatus 100 forms a toner image on a sheet P, based on image information read by the image reading apparatus 101, or an image signal transmitted from a host apparatus, such as a personal computer, communicably connected to the image forming apparatus 100. Examples of the sheet P serving as a recording medium include sheet materials such as plain paper sheets, plastic film sheets, and cloth sheets.

The image forming apparatus main body 104 includes laser scanners 107, 108, 109, and 110 and image forming units 111, 112, 113, and 114, which are image forming units using an electrophotographic method and correspond to yellow, magenta, cyan, and black (YMCK) colors, respectively, and a fixing unit 118. The laser scanners 107 to 110 irradiate photosensitive members included in the image forming units 111 to 114 with laser beams based on input image signals, respectively. These image forming units 111 to 114 are disposed along an intermediate transfer belt 115.

The image forming unit 111 forms a yellow toner image, and the formed yellow toner image is primarily transferred onto the intermediate transfer belt 115. The image forming unit 112 forms a magenta toner image, and the formed magenta toner image is primarily transferred, in an overlapped manner, onto the yellow toner image that has been transferred on the intermediate transfer belt 115. The image forming unit 113 forms a cyan toner image, and the formed cyan toner image is primarily transferred, in an overlapped manner, onto the yellow and magenta toner images that have been transferred on the intermediate transfer belt 115. The image forming unit 114 forms a black toner image, and the formed black toner image is primarily transferred, in an overlapped manner, onto the yellow, magenta, and cyan images that have been transferred on the intermediate transfer belt 115.

Sheet feed cassettes 105 are disposed at the bottom of the image forming apparatus main body 104 in such a way that the sheet feed cassettes 105 are to be drawable toward the front side. In the image forming apparatus 100, the sheet P stored in one of the sheet feed cassettes 105 is fed by corresponding one of pickup rollers 106 toward a secondary transfer nip portion at which the intermediate transfer belt 115 and a secondary transfer unit 116 are in contact with each other. When conveying the sheet P, the image forming apparatus 100 conveys the sheet P in synchronization with the toner image on the intermediate transfer belt 115. The multiple toner image on the intermediate transfer belt 115 is transferred onto the sheet P at the secondary transfer nip portion, by the action of a secondary transfer bias voltage applied to the secondary transfer unit 116.

The sheet P with the toner image transferred thereon by the secondary transfer unit 116 is conveyed by a conveyance belt 117 to the fixing unit 118. The toner image is heated and pressed by the fixing unit 118 so that the toner image is fixed on the sheet P. Then, after the toner image is fixed on the sheet P, the sheet is discharged to a discharge tray 119.

In the present exemplary embodiment, the image forming apparatus 100 is provided with the electro-photographic image forming unit, but the image forming unit is not limited to this example, and an image forming method such as an ink-jet method may be employed.

<Image Reading Apparatus>

Figure 2:
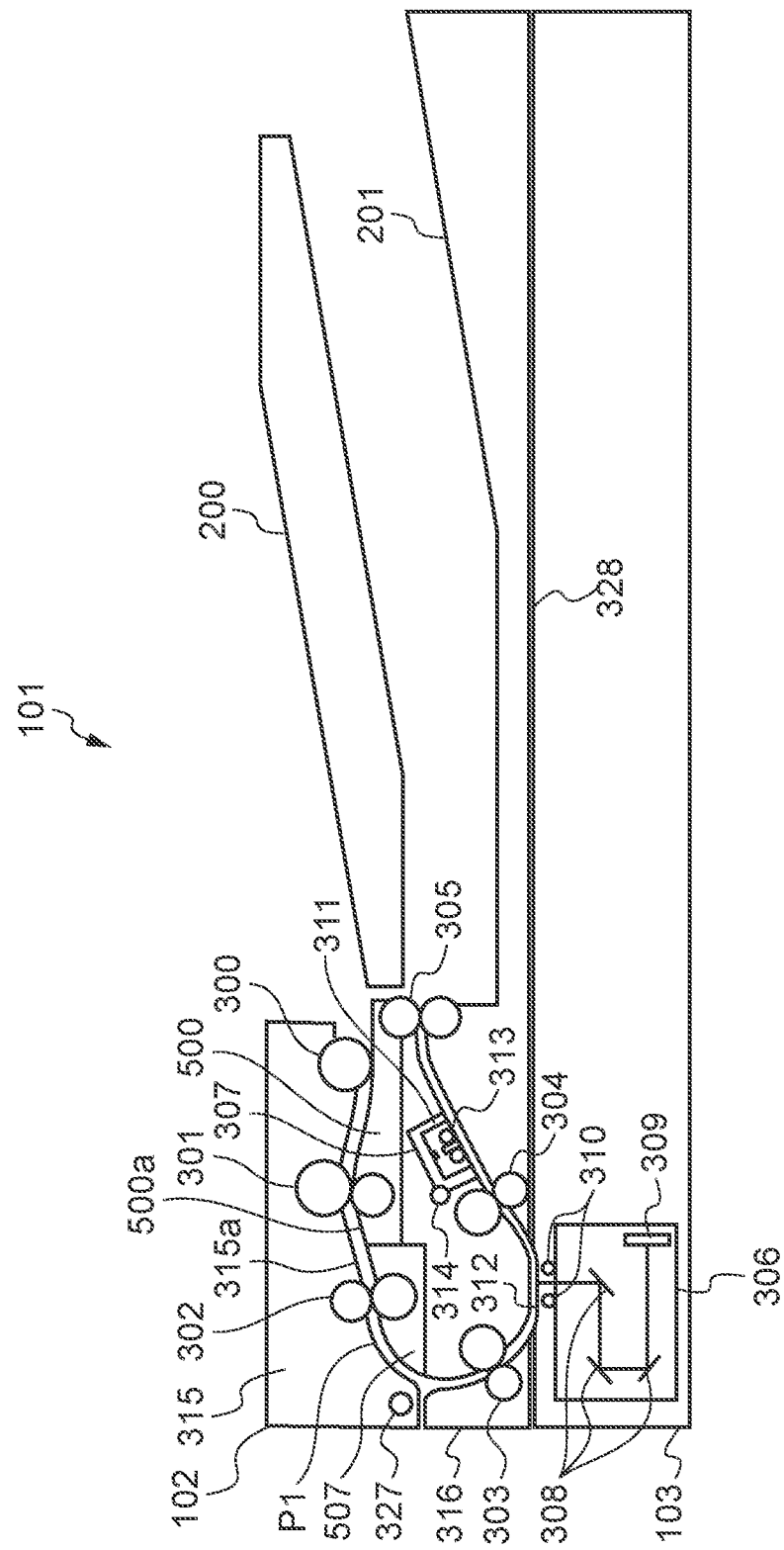
FIG. 2 is a schematic cross-section diagram of an image reading apparatus.
Figure 3:
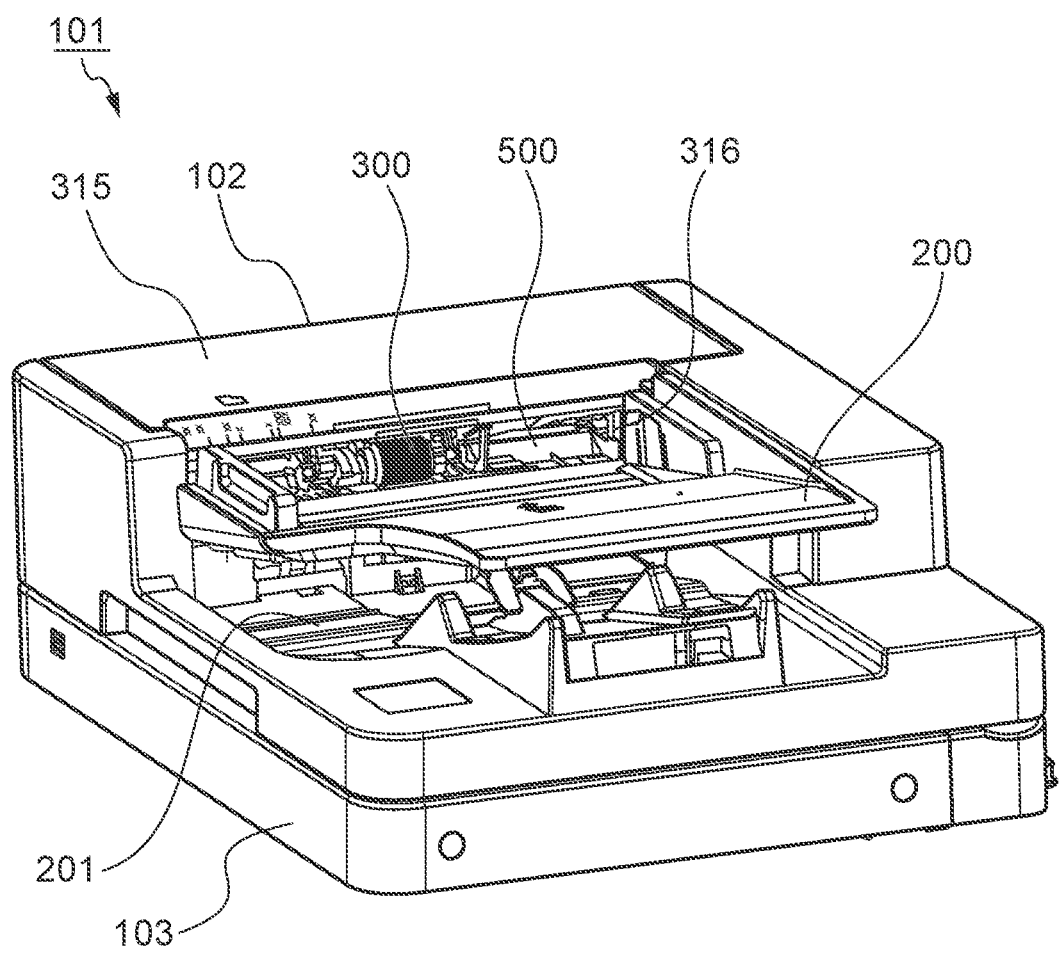
FIG. 3 is a perspective view of the image reading apparatus.

The image reading apparatus 101 will be described, with reference to FIGS. 2 and 3. FIG. 2 is a schematic cross-section diagram of the image reading apparatus 101, and FIG. 3 is a perspective view of the image reading apparatus 101. The image reading apparatus 101 includes a reader 103 and an automatic document feeder (ADF) 102 disposed above the reader 103. The ADF 102 is supported by a hinge (not illustrated) provided on the rear side of the image reading apparatus 101 to be rotatable with respect to the reader 103. The image reading apparatus 101 can perform an operation of reading image information from a stationary document placed on a platen glass 328 of the reader 103 (fixed-reading operation), and an operation of reading image information while a sheet as a document is being conveyed by the ADF 102 (moving document reading operation).

The reader 103 includes the platen glass 328 on which a document is placed, and a reading unit 306 for reading image information about the document placed on the platen glass 328 while moving in a sub-scanning direction (horizontal direction in FIG. 2) under the platen glass 328. The reader 103 includes a first moving document reading glass 312. The reading unit 306 can read image information via the first moving document reading glass 312 by optically scanning the document conveyed by the ADF 102.

The reading unit 306 includes a sensor substrate 309, a light source 310, and a plurality of mirrors 308. The sensor substrate 309 is mounted with a charge-coupled device (CCD) image sensor serving as a light receiving device. The light source 310 irradiates the document with light. The plurality of mirrors 308 guides the light reflected from the document to the imaging plane of the light receiving element.

The ADF 102 includes a document tray 200, a discharge tray 201 disposed below the document tray 200, and a reading unit 307. A feed roller 300, a separation roller pair 301, conveyance roller pairs 302, 302, 303, and 304, and a discharge roller pair 305 are disposed in the ADF 102 along a conveyance path P1. The document tray 200 is a stacking portion on which sheets serving as documents are stacked. The discharge tray 201 is a discharge portion to which the sheets from which the image information has been read are discharged. The conveyance roller pairs 303 and 304, and the discharge roller pair 305 are rotatably supported in a base unit 316 of the ADF 102. The base unit 316, which is a main body of the ADF 102, includes a plurality of conveyance guide members, a frame formed of a sheet metal, an outer casing (housing), and the like. The document tray 200 is configured to be rotatable around a rotation shaft (not illustrated) with respect to the base unit 316, and a user can easily take out the document on the discharge tray 201 by rotating the document tray 200 upward.

The reading unit 307 includes a contact image sensor (CIS) 311 serving as a reading device, and a second moving document reading glass 313. The second moving document reading glass 313 is a transparent member transmitting light from the document, and the CIS 311 reads the image information from the document conveyed through the conveyance path P1 via the second moving document reading glass 313. The reading unit 307 is rotatably supported by the base unit 316 of the ADF 102 via a rotation shaft 314.

When a user sets a document bundle on the document tray 200 and then issues an instruction to start a reading operation via an operation unit (not illustrated), the feed roller 300 sequentially sends out to the conveyance path P1 the document from the top of the bundle. The sent-out documents are separated by the separation roller pair 301 one by one, and sequentially transferred by the conveyance roller pairs 302, 303, and 304 through the conveyance path P1. When the document passes over the first moving document reading glass 312 of the reader 103, the reading unit 306 reads image information on a first surface of the document (front surface). In a similar manner, when the document passes over the second moving document reading glass 313, the reading unit 307 reads image information on a second surface (back surface), which is the surface opposite to the first surface. The document with the image information read therefrom is discharged out of the ADF 102 by the discharge roller pair 305, and stacked on the discharge tray 201. The first surface of the document is the upper surface in a state where the document is stacked on the document tray 200, and the second surface of the document is the lower surface in the state where the document is stacked on the document tray 200.

The ADF 102 is provided with an open/close cover 315 serving as an open/close member that forms the upper surface of the image reading apparatus 101. The open/close cover 315 is rotatably (openable/closable) supported by the base unit 316 of the ADF 102 via a rotation shaft 327, to rotate around an axis line A extending in a width direction orthogonal to the sheet conveyance direction (refer to FIG. 4 described below). The open/close cover 315 is provided with an upper guide 315a that forms the conveyance path P1 in combination with a lower guide 500a of a rotational guide member 500 serving as a conveyance guide member. The upper guide 315a is a guide surface that faces the upper surface of a sheet fed by the feed roller 300 to guide the sheet. The lower guide 500a is a guide surface that faces the lower surface of a sheet fed by the feed roller 300 to guide the sheet. The open/close cover 315 is fixed to the base unit 316 by an open/close regulation mechanism (not illustrated) at a closed position (position illustrated in FIG. 3). In a case where a user opens the open/close cover 315, the open/close regulation is released and the user can open the open/close cover 315 when the user pulls up the open/close cover 315.

As illustrated in FIG. 3, in a state where the open/close cover 315 is closed, a part of the rotational guide member 500 is covered by the open/close cover 315. In the state where the open/close cover 315 is closed, the rotational guide member 500 may be entirely covered by the open/close cover 315. The open/close cover 315 is provided with the feed roller 300, one separation roller of the separation roller pair 301, and one conveyance roller of the conveyance roller pair 302, which are upper side rollers in FIG. 2. Accordingly, when the open/close cover 315 rotates upward from the closed position to the open position, a part of the conveyance path P1 is opened to expose the rotational guide member 500 to the outside of the ADF 102, and it is possible to rotate the rotational guide member 500 as will be described below.

<Cleaning of Glass>

While the image reading apparatus 101 repeats the moving document reading operation, dusts such as paper powder, and foreign particles including glue or ink having adhered to the document may adhere to the first moving document reading glass 312 and the second moving document reading glass 313. If the moving document reading is performed in a state where foreign substances are adhering to the reading ranges of the reading units 306 and 307 in the first moving document reading glass 312 and the second moving document reading glass 313, line-like images, which are not present in the original document, are read at positions corresponding to the foreign substances. This is a phenomenon caused when optical paths in reading by the reading units 306 and 307 are blocked to become shadows due to the foreign substances adhering to the first moving document reading glass 312 and the second moving document reading glass 313 (hereinbelow, referred to as an image streak).

To prevent the generation of the image streak, it is effective to eliminate the foreign substances that cause the image streak by cleaning the first moving document reading glass 312 and the second moving document reading glass 313 as appropriate. A user can clean the reading unit 306 of the reader 103 from up above, because the first moving document reading glass 312 is exposed by rotating the ADF 102 upward from the reader 103. On the other hand, the reading unit 307 of the ADF 102 is disposed inside the base unit 316. As illustrated in FIG. 2, in the present exemplary embodiment, the reading unit 307 is disposed below the rotational guide member 500 and in an area inside the conveyance path P1 curving in a U-shape. Accordingly, a configuration to expose the second moving document reading glass 313 to the outside of the image reading apparatus 101 (i.e., method to allow a user to access the second moving document reading glass 313) is required. Thus, in the present exemplary embodiment, the rotational guide member 500 and the reading unit 307 are respectively configured to be rotatable with respect to the base unit 316, to enable the second moving document reading glass 313 of the reading unit 307 to be exposed to the outside of the ADF 102.

Figure 4:
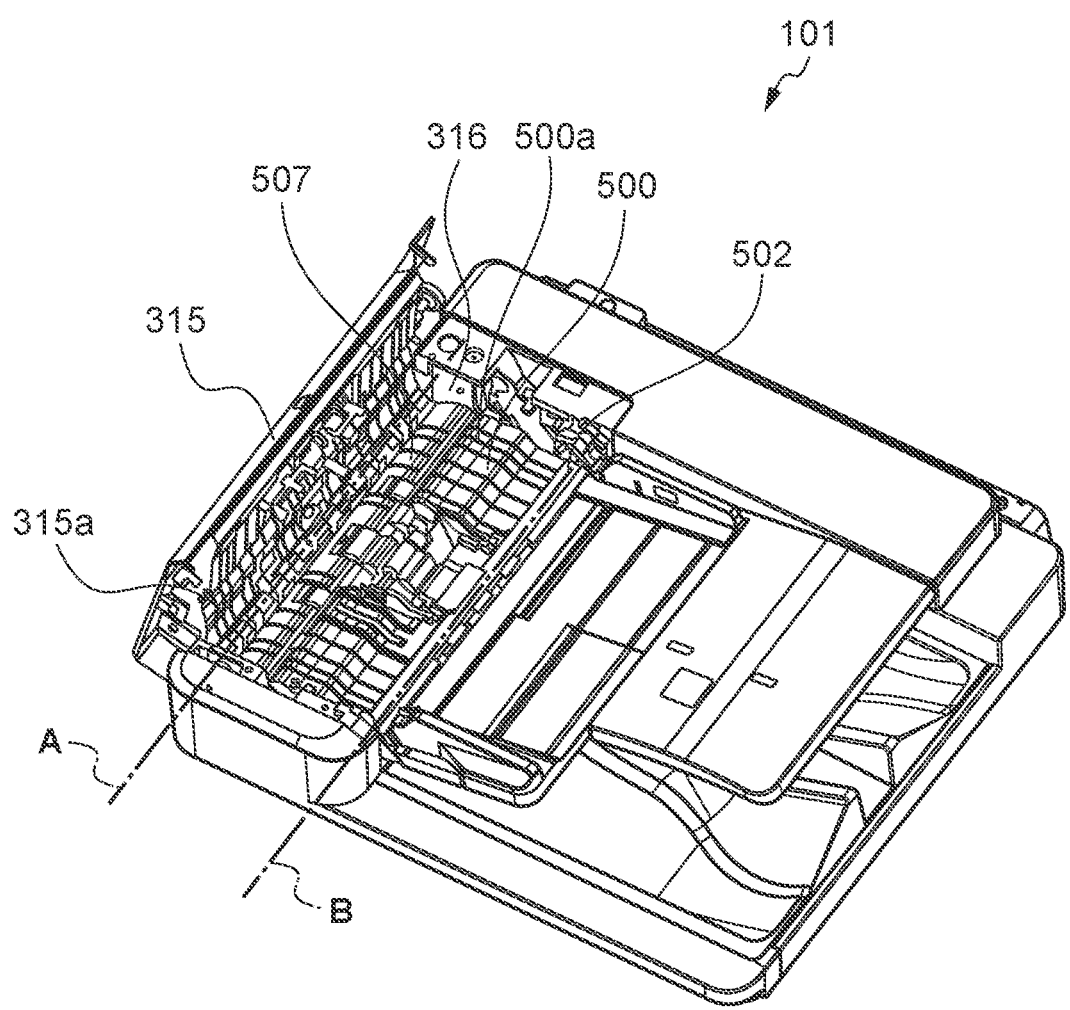
FIG. 4 is a perspective view of the image reading apparatus with its open/close cover in an open state.
Figure 5:
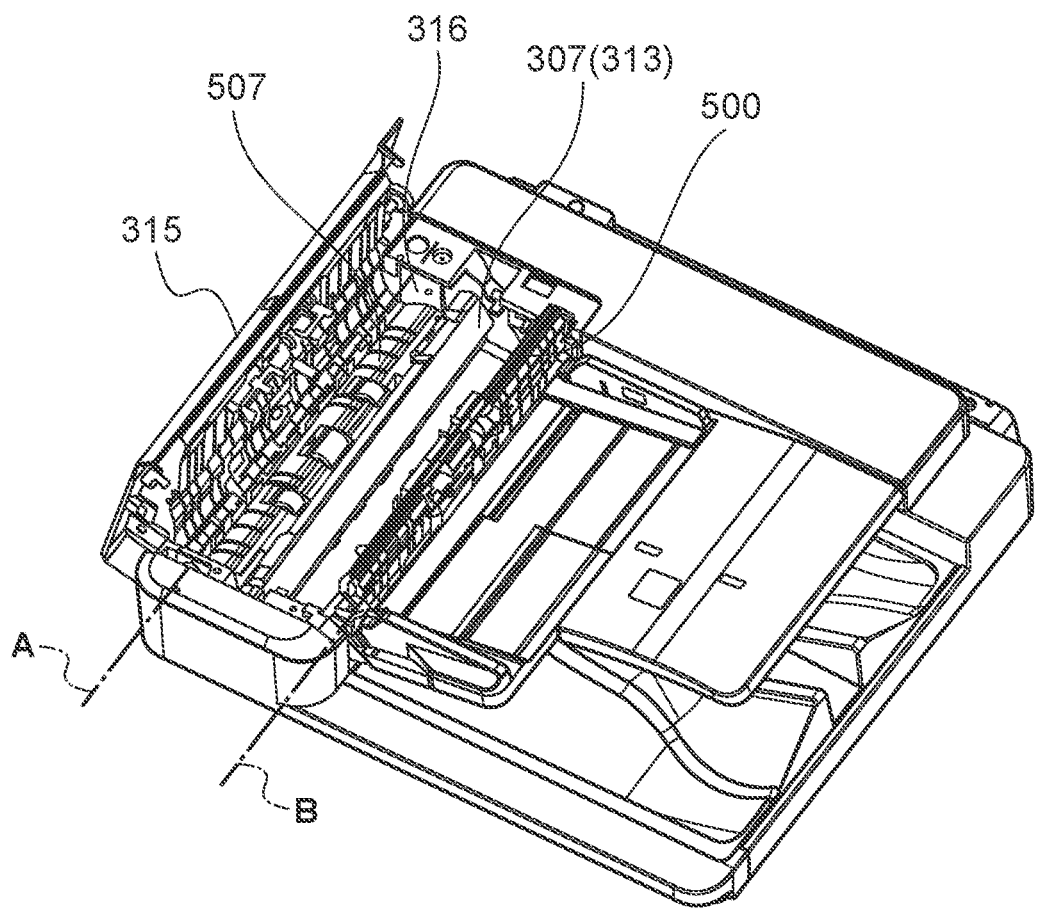
FIG. 5 is a perspective view of the image reading apparatus with its open/close cover and a rotational guide member being in an open state.

FIG. 4 is a perspective view of the image reading apparatus 101 in a state where the open/close cover 315 is open. FIG. 5 is a perspective view of the image reading apparatus 101 in a state where the open/close cover 315 and the rotational guide member 500 are open. As illustrated in FIG. 3, when the open/close cover 315 is closed, the open/close cover 315 covers the rotational guide member 500. On the other hand, as illustrated in FIG. 4, when the open/close cover 315 is closed, the rotational guide member 500 is exposed to the outside of the image reading apparatus 101 when viewed from above.

In the present exemplary embodiment, the rotational guide member 500 is rotatably supported by the base unit 316 of the ADF 102 via a rotation shaft 502, and rotates around an axis line B extending in a width direction orthogonal to the sheet conveyance direction. The rotational guide member 500 can rotate between a position at which the rotational guide member 500 covers the reading unit 307 when viewed from above as illustrated in FIG. 4, and a position at which the reading unit 307 is exposed to the outside of the image reading apparatus 101 when viewed from above as illustrated in FIG. 5. On the other hand, a fixed guide member 507, which successively guides a sheet from the lower guide 500a that is a guide surface of the rotational guide member 500, is fixed to the base unit 316 of the ADF 102. The fixed guide member 507 is a downstream guide located near the downstream end of the lower guide 500a and faces the upper guide 315a to form the conveyance path P1. The reading unit 307 is configured to rotate in conjunction with the rotation of the rotational guide member 500. As illustrated in FIG. 5, when the rotational guide member 500 is opened in a state where the open/close cover 315 is open, the reading unit 307 rotates to expose the second moving document reading glass 313 to the outside of the image reading apparatus 101 when viewed from above. In this state, the second moving document reading glass 313 faces obliquely upwards.

With this configuration, a user can clean the second moving document reading glass 313 of the reading unit 307.

<Document Feeding Portion>

Figure 6:
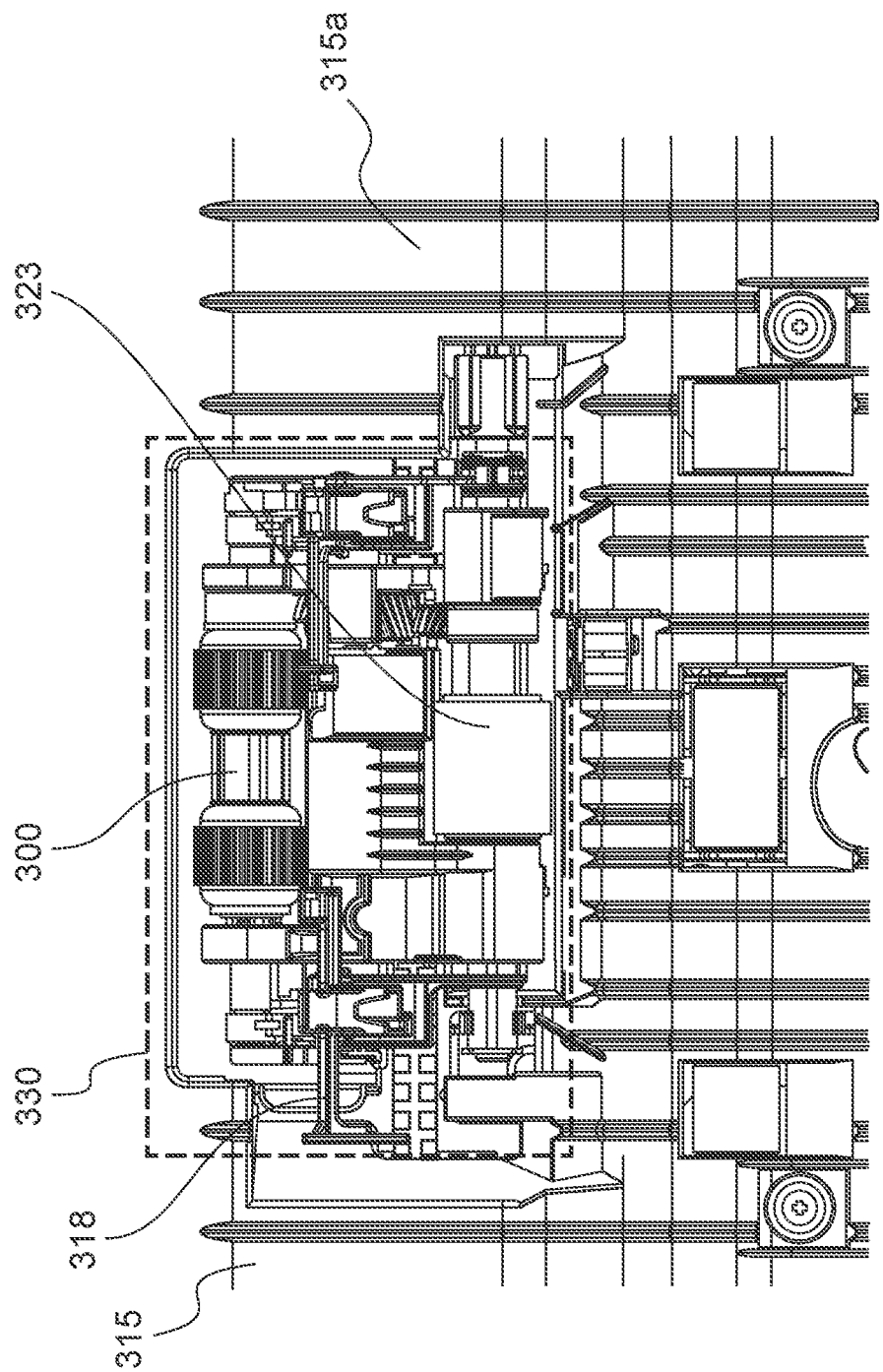
FIG. 6 is diagram illustrating a feed unit viewed from below.
Figure 7:
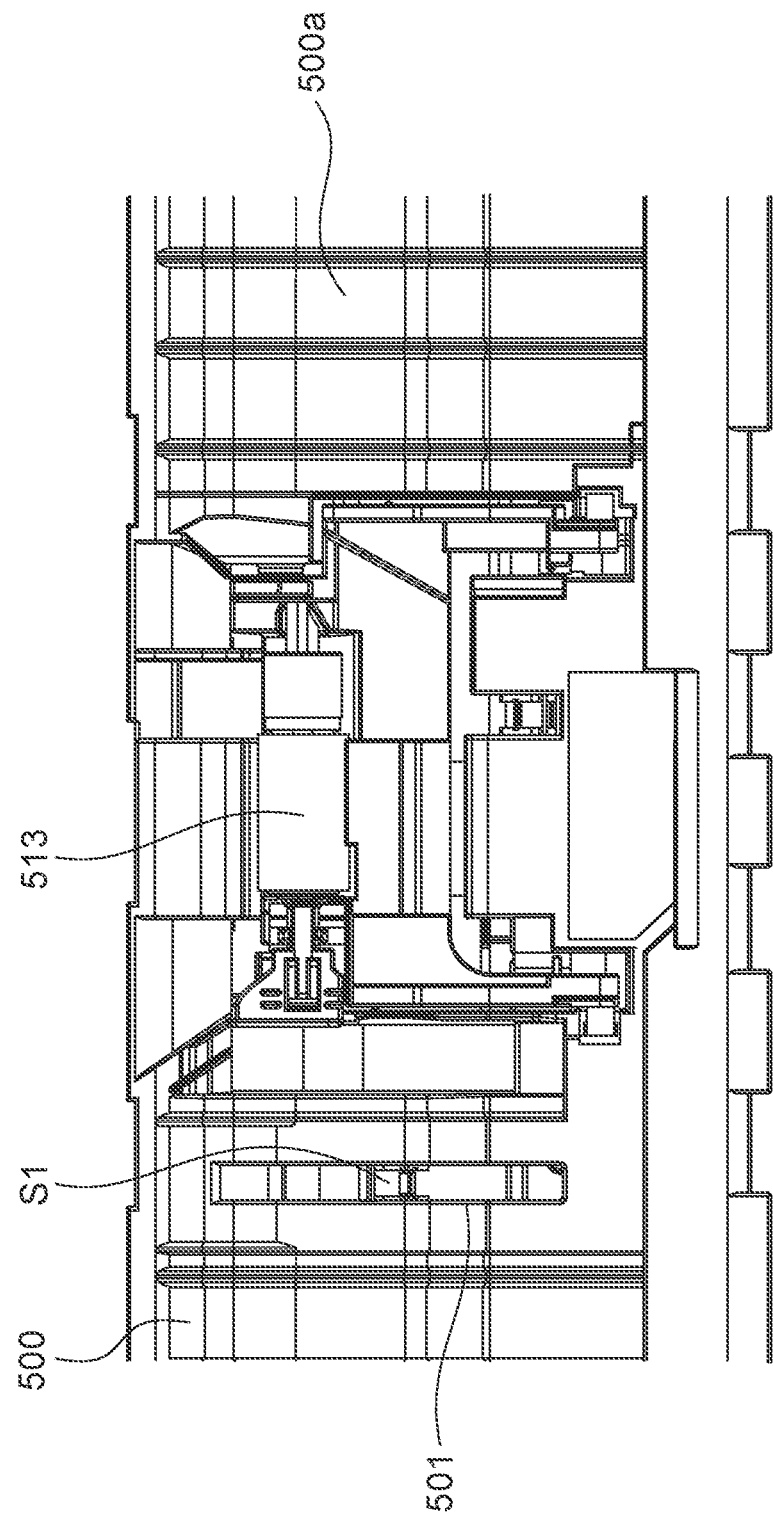
FIG. 7 is a top view of the rotational guide member.
Figure 8:
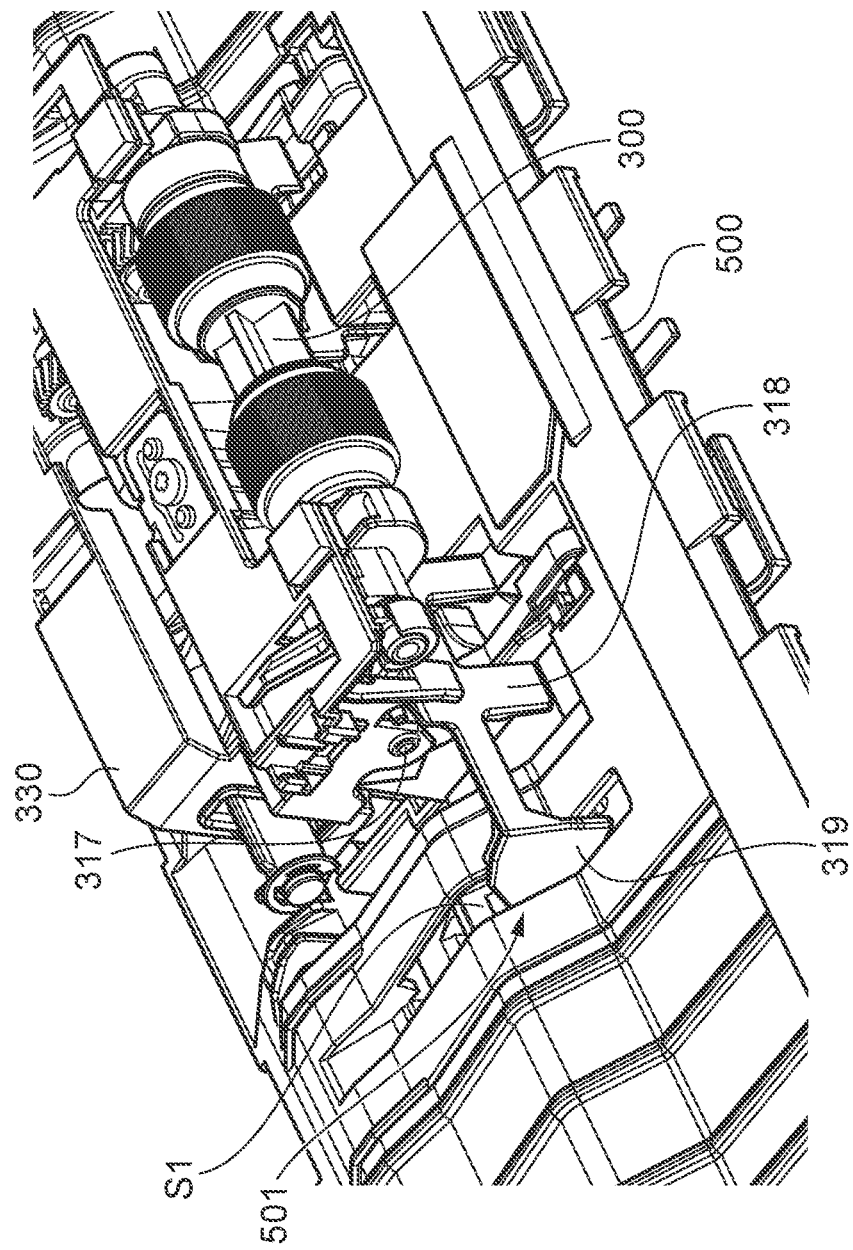
FIG. 8 is a perspective view of a document (sheet) feeding portion (hereinbelow, referred to as a feeding portion).

A document (sheet) feeding portion (hereinbelow, referred to as a feeding portion) of the ADF 102 will be described. FIG. 6 is a diagram illustrating a document (sheet) feed unit (hereinbelow, referred to as a feed unit) 330 held on the open/close cover 315 viewed from the conveyance path P1 side. FIG. 7 is a diagram illustrating the rotational guide member 500 viewed from the conveyance path P1 side. FIG. 8 is a diagram illustrating the feeding portion in a state where the open/close cover 315 is closed. FIGS. 6 to 8 illustrate only the parts necessary for description.

As illustrated in FIG. 6, the open/close cover 315 holds the feed unit 330 for feeding sheets stacked on the document tray 200, to be attachable and detachable. The feed unit 330 of the feeding portion includes the feed roller 300 for feeding a sheet into the conveyance path P1, and a conveyance roller 323 for conveying the sheet fed by the feed roller 300. On the other hand, as illustrated in FIG. 7, the rotational guide member 500 includes a separation roller 513 that forms a separation nip in combination with the conveyance roller 323, and a sensor S1, which is a photointerrupter including a light emitting unit and a light receiving unit. The conveyance roller 323 and the separation roller 513 are included in the above-described separation roller pair 301. The lower guide 500a of the rotational guide member 500 is provided with a slit 501, which is a cutout portion. The sensor S1 serving as a detection unit is provided inside the slit 501, and is located below the sheet guide surface of the lower guide 500a.

As illustrated in FIG. 8, the feed unit 330 includes a flag member 318 supported to be rotatable around a rotational fulcrum 317. The flag member 318 provided on the open/close cover 315 via the feed unit 330 is configured to be swingable by being pressed by a sheet stacked on the document tray 200. The flag member 318 functions as a regulation member for regulating the leading edge position of the sheet stacked on the document tray 200, as described below. A light shielding member 319 that moves in conjunction with the operation of the flag member 318 is integrally formed at a lower end of the flag member 318, and enters the inside of the rotational guide member 500 passing through the slit 501. The light shielding member 319 of the flag member 318 can switch between a light-shielding state and a light transmission state of the sensor S1 arranged inside the slit 501 by blocking or unblocking the optical path to the sensor S1.

Figure 9:
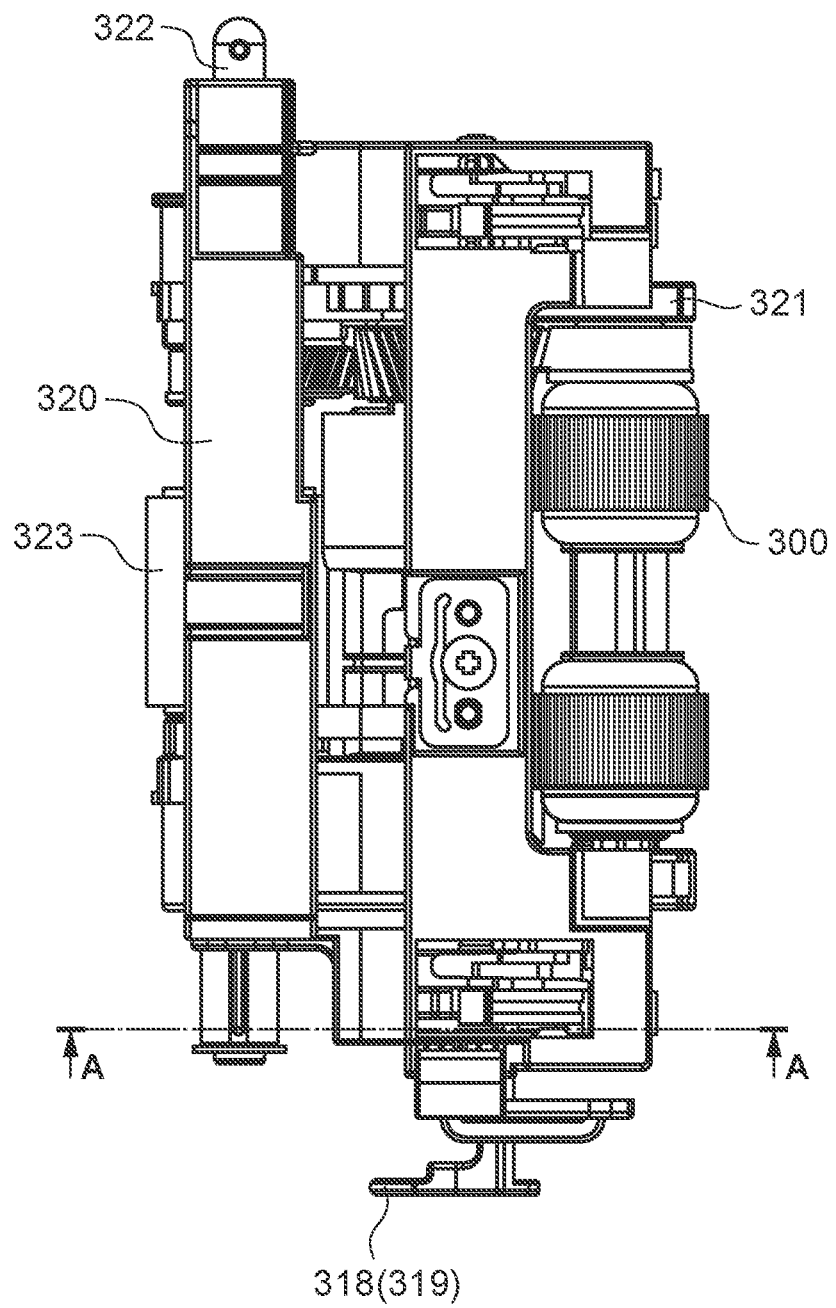
FIG. 9 is a top view of a document (sheet) feed unit (hereinbelow, referred to as a feed unit).
Figure 10:
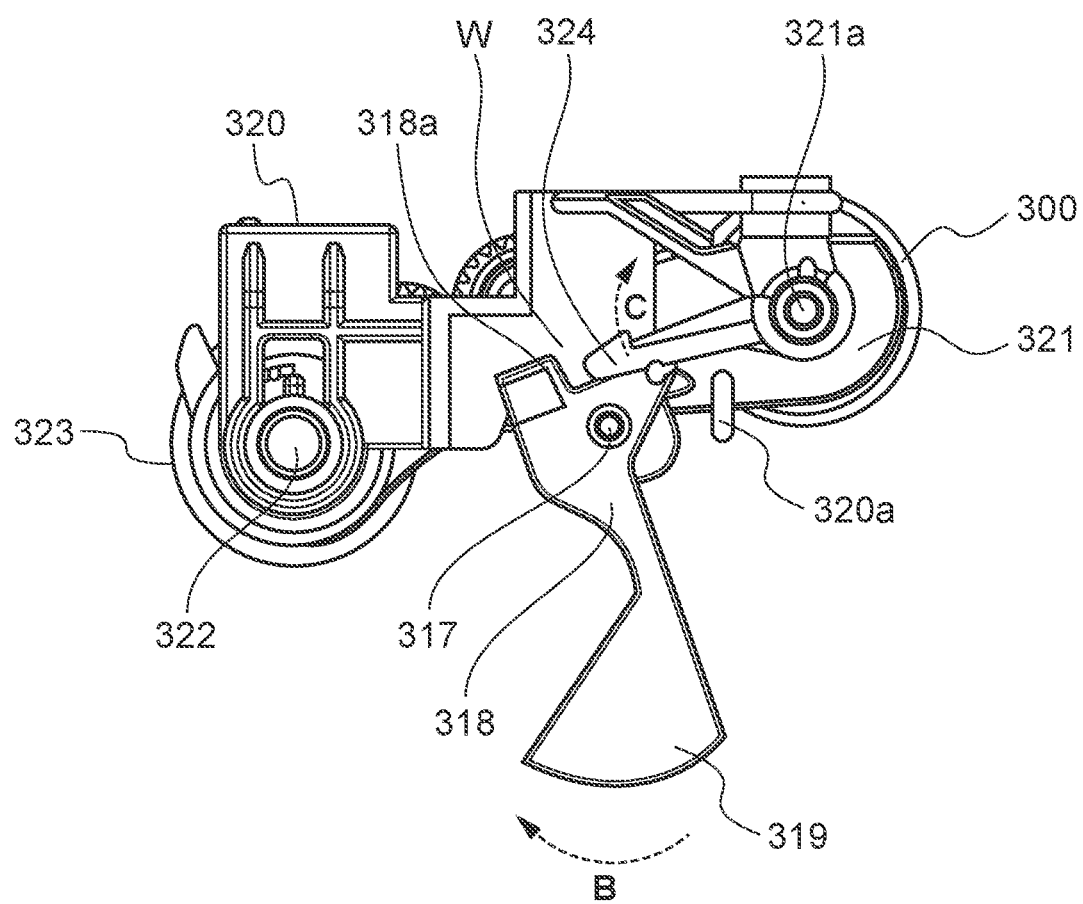
FIG. 10 is a cross-section diagram of the feed unit.

The flag member 318 is configured to be switchable between a locked state and an unlocked state by the operation of the feed roller 300. The operation of the feed roller 300 will be described with reference to FIGS. 9 and 10. FIG. 9 is a top view of the feed unit 330, and FIG. 10 is an A-A cross-section diagram in FIG. 9.

The feed unit 330 includes a flag holder 320 held on the open/close cover 315, and the flag member 318 is supported to be rotatable around the rotational fulcrum 317 provided on the flag holder 320. The feed unit 330 is provided with an arm member 321 that rotatably supports the feed roller 300. The arm member 321 is a member extending in the sheet feed direction and supported to be rotatable around a sheet feed shaft 322 that is a rotation shaft of the conveyance roller 323, and the feed roller 300 is configured to move up and down by the rotation of the arm member 321. More specifically, before feeding the sheet, the feed roller 300 is located at a separation position separated from the sheet on the document tray 200, and when feeding the sheet, the feed roller 300 moves down to a contact position at which the feed roller 300 contacts the sheet on the document tray 200. In this way, the arm member 321 moves up and down the feed roller 300 between the separation position and the contact position.

The arm member 321 is provided with a lock member 324 for regulating the swinging motion of the flag member 318, and the lock member 324 is supported to be rotatable around a rotational fulcrum 321a provided in the arm member 321. On the other hand, the flag member 318 is provided with a contact portion 318a, and a gap W is formed between the contact portion 318a of the flag member 318 and the lock member 324 when no sheet is stacked on the document tray 200. At that time, the flag member 318 is located at a non-contact position (first position) illustrated in FIG. 10 due to its own weight, and the light shielding member 319 of the flag member 318 does not block the optical path of the sensor S1. As a result, the sensor S1 is OFF, and outputs a signal indicating no sheet stacked on the document tray 200. In the present exemplary embodiment, the non-contact position serving as the first position is a position at which the flag member 318 is not in contact with the sheet on the document tray 200.

When a user sets a sheet on the document tray 200, the leading edge of the sheet is brought into contact with the upstream end of the flag member 318. At this time, the flag member 318 rotates in an arrow B direction by an amount corresponding to the gap W by being pressed by the leading edge of the sheet. In this way, the contact portion 318a comes into contact with the lock member 324, and the flag member 318 turns into a state where the rotation in the arrow B direction is regulated (locked state). The leading edge of the sheet is regulated by the flag member 318 in the locked state. In other words, the lock member 324 positions the flag member 318 at a regulation position (second position) at which the leading edge position of the sheet is regulated. The regulation position is a position reached when the flag member 318 has rotated downstream beyond the non-contact position in the sheet feed direction, and also at which the flag member 318 blocks the conveyance path P1. At this time, the light shielding member 319 of the flag member 318 is in the state of blocking the optical path of the sensor S1. As a result, the sensor S1 is ON, and outputs a signal indicating the presence of the sheet on the document tray 200. In other words, the sensor S1 can detect the sheet stacked on the document tray 200 based on the movement of the flag member 318 from the non-contact position to the regulation position.

Then, in the process of the feed roller 300 moving down from the separation position to the contact position, the arm member 321 rotates down around the sheet feed shaft 322, and the lock member 324 is rotated in an arrow C direction by contacting a rib 302a of the flag holder 320. In this way, the lock member 324 moves to a position at which the lock member 324 does not contact the contact portion 318a of the flag member 318, and the flag member 318 turns into a state (non-locked state) where the flag member 318 is further rotatable in the arrow B direction beyond the regulation position. The flag member 318 moves to a sheet feed position (third position) allowing the sheet to pass, by being pushed by the sheet fed by the feed roller 300. In other words, the lock member 324 turns into a state where the lock member 324 allows the flag member 318 to rotate from the regulation position to the sheet feed position along with the feed roller 300 moving down from the separation position to the contact position. The sheet feed position is a position reached when the flag member 318 has rotated beyond the regulation position downstream in the sheet feed direction, and also at which the flag member 318 unblocks the conveyance path P1. With the above-described mechanism, the state of the flag member 318 can be switched between the locked state and the non-locked state, by the moving up and down operation of the feed roller 300. In the present exemplary embodiment, the lock member 324 and the rib 320a are included in the lock mechanism.

<Positioning of Rotational Guide Member>

As described above, the ADF 102 according to the present exemplary embodiment is configured to be able to open the open/close cover 315 and the rotational guide member 500 when a user cleans the second moving document reading glass 313 of the reading unit 307 or performs a jam clearance operation. The user who has finished these operations needs to close the open/close cover 315 after closing the rotational guide member 500 to enable the ADF 102 to convey a sheet.

In the present exemplary embodiment, the rotation shaft 502 of the rotational guide member 500 has a clearance in a width direction (main scanning direction) required for the rotational guide member 500 to rotate. In other words, when the open/close cover 315 is open, the rotational guide member 500 is configured to be movable in the main scanning direction of the rotational guide member 500. The position of the rotational guide member 500 in the width direction is determined by the open/close cover 315 being closed. In the present exemplary embodiment, this clearance is 1.6 mm, and when the open/close cover 315 is open, the rotational guide member 500 can move by 1.6 mm in the width direction.

Figure 11:
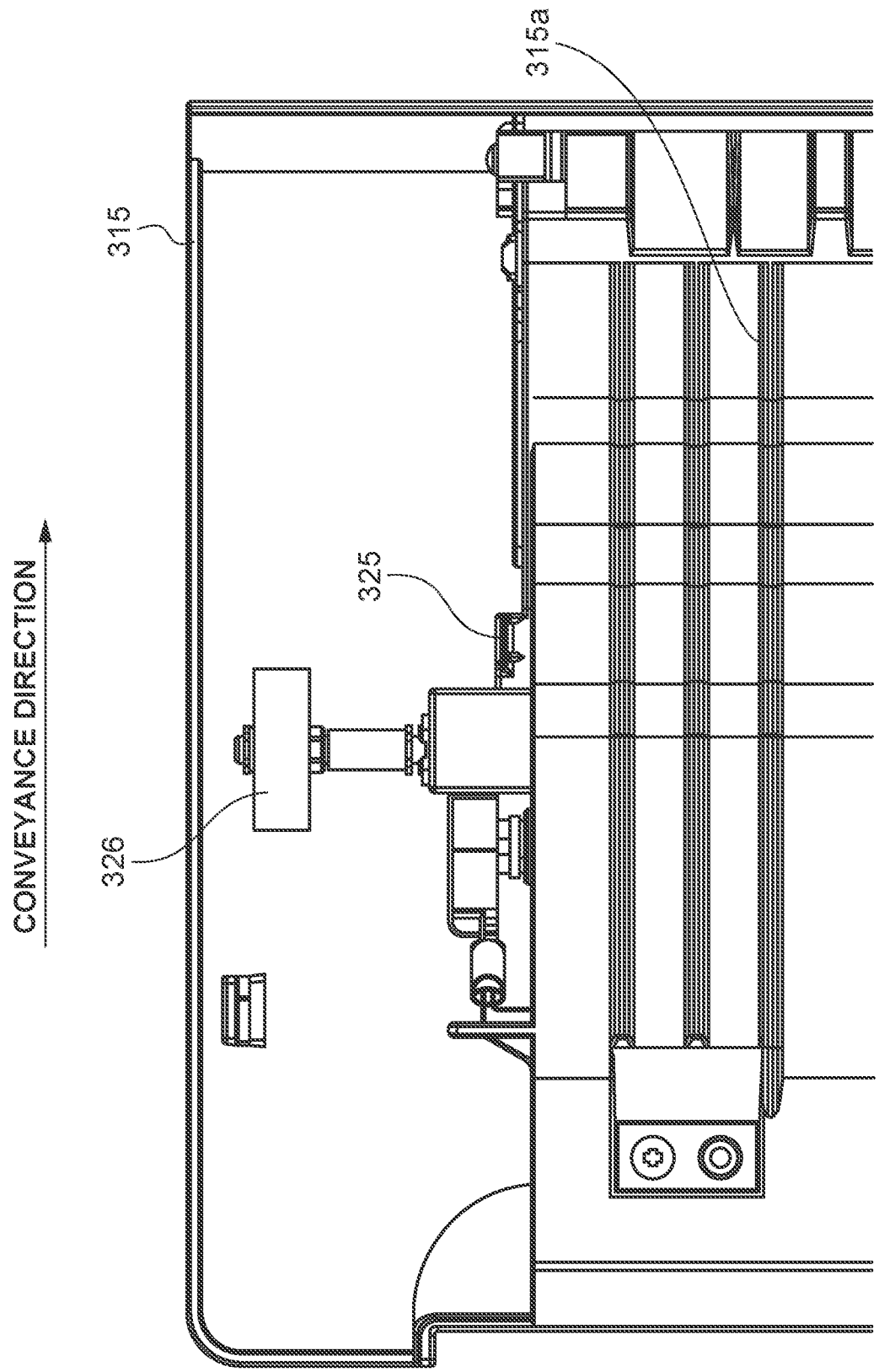
FIG. 11 an enlarged view illustrating a rear side of the open/close cover in the image reading apparatus.
Figure 12:
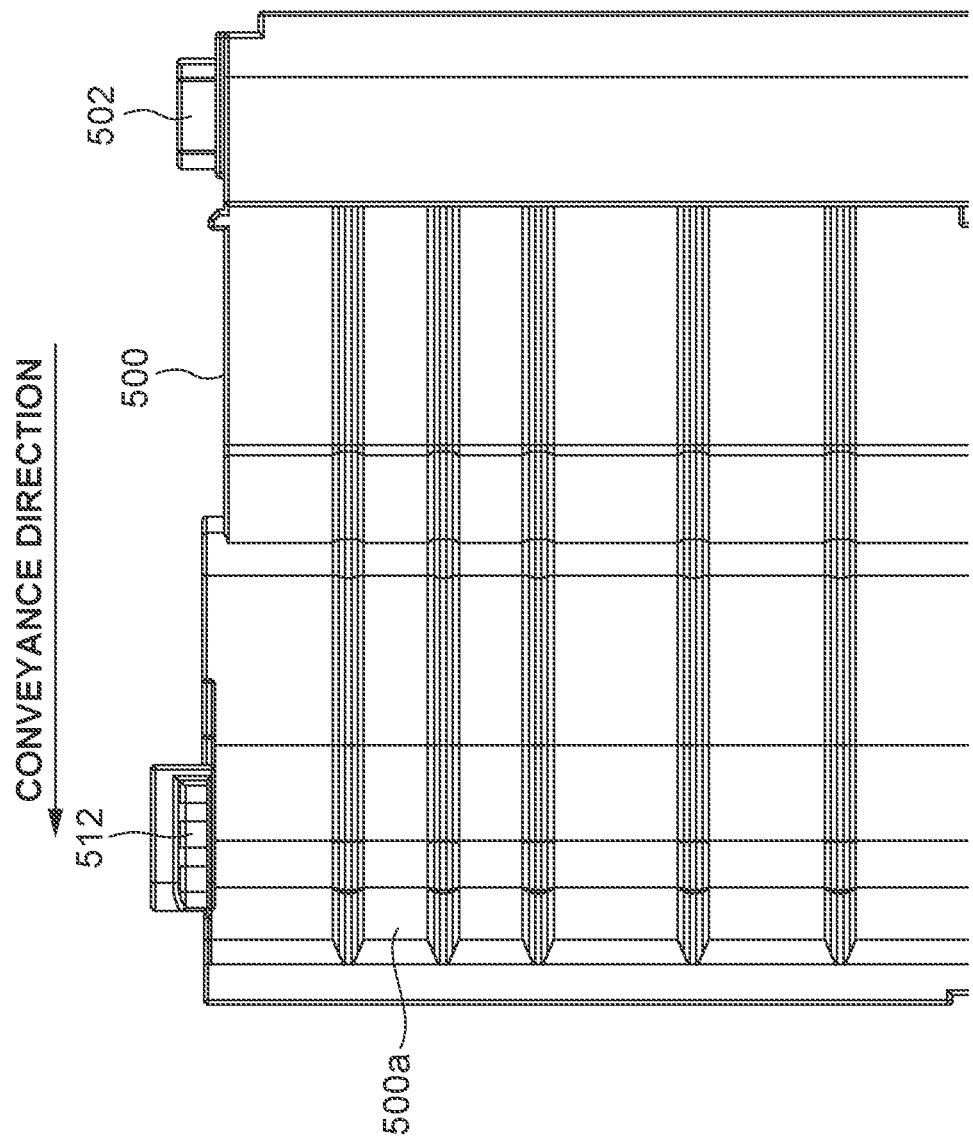
FIG. 12 is an enlarged view illustrating a rear side of the rotational guide member in the image reading apparatus.

The process of the open/close cover 315 rotating from the open position to the closed position will be described in detail. FIG. 11 is an enlarged view illustrating the rear side of the open/close cover 315 in the image reading apparatus 101. FIG. 12 is an enlarged view illustrating the rear side of the rotational guide member 500 in the image reading apparatus 101. A gear 326 for driving the feed roller 300 and the conveyance roller 323, and a protruding portion 325 for positioning the rotational guide member 500 in the width direction are provided on the rear side of the open/close cover 315. The protruding portion 325 is formed so as to protrude downward in a state where the open/close cover 315 is closed. A groove portion 512 with its upside being open serving as a fitted portion is provided at a position opposing the protruding portion 325 on the rear side of the rotational guide member 500. The protruding portion 325 and the groove portion 512 are provided in the conveyance path P1 outside the area of the conveyance path P1 through which a sheet passes. In the present exemplary embodiment, the position of the rotational guide member 500 in the width direction relative to the open/close cover 315 is determined by the protruding portion 325 fitting into the groove portion 512.

The protruding portion 325 fits into the groove portion 512 in the process of the open/close cover 315 closing from the open state. With the state where the open/close cover 315 is closed being set as a reference (0 degree), FIGS. 13A and 13B are diagrams each illustrating a state where the open/close cover 315 is open by 8 degrees, and FIGS. 14A and 14B are diagrams each illustrating a state where the open/close cover 315 is open by 6 degrees. In FIGS. 13A, 13B, 14A, and 14B, FIGS. 13A and 14A are side views each illustrating the open/close cover 315 and the rotational guide member 500 viewed from the rear side of the ADF 102, and FIGS. 13B and 14B are enlarged views each illustrating a positioning portion of the rotational guide member 500 viewed from an arrow D direction in each state.

When a user starts closing the open/close cover 315 toward the rotational guide member 500, as illustrated in FIG. 13B, the protruding portion 325 of the open/close cover 315 starts fitting into the groove portion 512 of the rotational guide member 500 at a position at which the rotational angle of the open/close cover 315 is 8 degrees. In other words, when the rotational angle of the open/close cover 315 is 8 degrees, the front edge of the protruding portion 325 enters the groove portion 512. On the other hand, as illustrated in FIG. 13A, when the rotational angle of the open/close cover 315 is 8 degrees, the flag member 318 provided on the feed unit 330 has not entered the slit 501 of the rotational guide member 500.

When the user further closes the open/close cover 315, as illustrated in FIG. 14A, the flag member 318 provided on the feed unit 330 starts entering the slit 501 of the rotational guide member 500 at a position at which the rotational angle of the open/close cover 315 is 6 degrees. As illustrated in FIG. 14B, the protruding portion 325 of the open/close cover 315 has entered the groove portion 512 of the rotational guide member 500. In a state where the open/close cover 315 is closed (i.e., rotational angle 0 degrees), the protruding portion 325 of the open/close cover 315 has completely fitted into the groove portion 512 of the rotational guide member 500. In this state, because the protruding portion 325 of the open/close cover 315 has fitted in the groove portion 512 of the rotational guide member 500, the position of the rotational guide member 500 in the width direction is determined.

In this way, the movement of the rotational guide member 500 in the width direction by an amount corresponding to the clearance is regulated by the protruding portion 325 fitting into the groove portion 512.

As described above, when the user starts closing the open/close cover 315, first, the front edge of the protruding portion 325 provided on the open/close cover 315 enters the groove portion 512 provided in the rotational guide member 500. Then, the flag member 318 provided on the feed unit 330 enters the slit 501 of the rotational guide member 500. When the open/close cover 315 has been completely closed, as illustrated in FIG. 2, the ADF 102 turns into the sheet conveyable state. With these configurations, when the flag member 318 enters the slit 501 of the rotational guide member 500, the position of the rotational guide member 500 in the width direction is determined by the open/close cover 315. In this way, it is possible to prevent the flag member 318 from running on the rotational guide member 500 or the sensor S1 to cause coming off or a damage.

In the present exemplary embodiment, the protruding portion 325 is provided on the open/close cover 315 and the groove portion 512 is provided in the rotational guide member 500, but the protruding portion 325 may be provided on the rotational guide member 500, and the groove portion 512 may be provided in the open/close cover 315. In other words, the protruding portion 325 may be provided on one of the open/close cover 315 and the rotational guide member 500, and the groove portion 512 may be provided in the other one of the open/close cover 315 and the rotational guide member 500.

According to the configuration of the present discloser, it is possible to improve the stability of a relative position between an open/close member and a conveyance guide member, in a configuration in which the open/close member and the conveyance guide member are rotatable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-112265, filed Jul. 13, 2022, which is hereby incorporated by reference herein in its entirety.

What is claimed is:

1. An image reading apparatus comprising:
   a base unit;
   a sheet stacking portion on which a sheet is to be stacked;
   a feeding portion configured to feed the sheet stacked on the sheet stacking portion;
   an open/close member including an upper guide that faces in a direction of an upper surface of the sheet fed by the feeding portion and that is configured to guide the sheet, and rotatably supported on the base unit;
   a conveyance guide member including a lower guide facing in a direction of a lower surface of the sheet fed by the feeding portion and, in combination with the upper guide, forming a sheet conveyance path through which the sheet is to be conveyed, and rotatably supported on the base unit;
   a reading unit disposed below the conveyance guide member and configured to read an image on the sheet fed by the feeding portion;
   a protruding portion provided on one of the open/close member and the conveyance guide member; and
   a fitted portion provided on the other one of the open/close member and the conveyance guide member, and configured to be fitted with the protruding portion,
   wherein the conveyance guide member is configured to rotate with respect to the base unit to expose the reading unit to outside of the image reading apparatus when viewed from above,
   wherein the reading unit that includes a transparent member configured to transmit light from the sheet through the transparent member, and that is configured to rotate with respect to the base unit so as to expose the transparent member to outside of the image reading apparatus when viewed from above, and
   wherein, in a state where the open/close member is closed, a position of the conveyance guide member in a width direction is determined by the protruding portion fitting into the fitted portion.

2. The image reading apparatus according to claim 1, further comprising:
   a regulation member that is provided on the open/close member, is configured to swing by being pushed by the sheet stacked on the sheet stacking portion, and is movable between a first position at which the regulation member is not in contact with the sheet, a second position at which the regulation member is in contact with a leading edge of the sheet stacked on the sheet stacking portion to regulate a position of the leading edge of the sheet, and a third position at which the sheet fed by the feeding portion is allowed to pass; and
   a detection unit provided on the conveyance guide member and configured to detect the sheet stacked on the sheet stacking portion based on a movement of the regulation member from the first position to the second position.

3. The image reading apparatus according to claim 2,
   wherein the conveyance guide member has a cutout portion configured to receive entry of a lower end of the regulation member in the state where the open/close member is closed, and
   wherein the detection unit is provided inside the cutout portion.

4. The image reading apparatus according to claim 3, wherein, in a process of the open/close member closing from an open state, the lower end of the regulation member enters the cutout portion after a front edge of the protruding portion enters the fitted portion.

5. The image reading apparatus according to claim 2, wherein the feeding portion includes:
   a feed roller configured to rotate in contact with the sheet stacked on the sheet stacking portion,
   an arm member configured to move the feed roller up and down between a separation position at which the feed roller is separated from the sheet, and a contact position at which the feed roller is in contact with the sheet, and
   a lock mechanism configured to regulate a movement of the regulation member from the second position to the third position in a case where the feed roller is located at the separation position, and to allow the movement of the regulation member from the second position to the third position in a case where the feed roller is located at the contact position.

6. The image reading apparatus according to claim 1,
   wherein the protruding portion is provided on the open/close member, and
   wherein the fitted portion is provided in the conveyance guide member.

7. The image reading apparatus according to claim 1, wherein the protruding portion and the fitted portion are provided outside, in the width direction, an area of the sheet conveyance path through which the sheet is to pass.

8. An image forming apparatus comprising:
   the image reading apparatus according to claim 1; and
   an image forming unit configured to form a recording medium image on a recording medium based on image information about the sheet read by the image reading unit.

* * * * *